US009567452B2

United States Patent
Nagata et al.

(10) Patent No.: US 9,567,452 B2
(45) Date of Patent: Feb. 14, 2017

(54) CARBON NANOFIBER AGGREGATE, THERMOPLASTIC RESIN COMPOSITION, AND METHOD FOR PRODUCING THERMOPLASTIC RESIN COMPOSITION

(71) Applicant: ASAHI KASEI CHEMICALS CORPORATION, Tokyo (JP)

(72) Inventors: Kazuya Nagata, Tokyo (JP); Yoshiyuki Kashiwagi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 14/349,530

(22) PCT Filed: Oct. 12, 2012

(86) PCT No.: PCT/JP2012/076514
§ 371 (c)(1),
(2) Date: Apr. 3, 2014

(87) PCT Pub. No.: WO2013/054914
PCT Pub. Date: Apr. 18, 2013

(65) Prior Publication Data
US 2014/0288212 A1    Sep. 25, 2014

(30) Foreign Application Priority Data
Oct. 12, 2011   (JP) .................... 2011-225379

(51) Int. Cl.
*C08K 9/08*        (2006.01)
*C01B 31/04*       (2006.01)
(Continued)

(52) U.S. Cl.
CPC ............. *C08K 9/08* (2013.01); *B82Y 30/00* (2013.01); *B82Y 40/00* (2013.01); *C01B 31/0438* (2013.01);
(Continued)

(58) Field of Classification Search
CPC ....................... C08K 9/08; C08K 2201/003
See application file for complete search history.

(56) References Cited

U.S. PATENT DOCUMENTS

| 6,099,965 A | * | 8/2000 | Tennent | ................ B01J 20/20 264/29.1 |
| 2003/0092342 A1 | | 5/2003 | Tennent et al. | |

(Continued)

FOREIGN PATENT DOCUMENTS

| CN | 1225603 A | 8/1999 |
| EP | 2168914 A | 3/2010 |

(Continued)

OTHER PUBLICATIONS

International Preliminary report issued with respect to application PCT/JP2010/076514, mail date is Dec. 11, 2013.

(Continued)

*Primary Examiner* — Ling Choi
*Assistant Examiner* — Lanee Reuther
(74) *Attorney, Agent, or Firm* — Greenblum & Bernstein, P.L.C.

(57) ABSTRACT

There is provided a carbon nanofiber aggregate capable of suppressing scatter and having excellent dispersibility and filling property in a thermoplastic resin. A carbon nanofiber aggregate has a maximum void volume P1 ($cm^3/g$) at a pore diameter of 2,500 nm or more and 100,000 nm or less and a maximum void volume P2 ($cm^3/g$) at a pore diameter of 6 nm or more and less than 2,500 nm in pore distribution data measured by mercury porosimetry. The maximum void volume P1 and the maximum void volume P2 satisfy a specific relationship.

9 Claims, 3 Drawing Sheets

(51) Int. Cl.
*C08J 3/20* (2006.01)
*B82Y 30/00* (2011.01)
*B82Y 40/00* (2011.01)
*C08J 5/00* (2006.01)
*C08L 77/06* (2006.01)

(52) U.S. Cl.
CPC ............... *C08J 3/203* (2013.01); *C08J 5/005* (2013.01); *C08L 77/06* (2013.01); *C08J 2300/22* (2013.01); *C08K 2201/002* (2013.01); *C08K 2201/005* (2013.01)

(56) References Cited

U.S. PATENT DOCUMENTS

2007/0290393 A1    12/2007    Tennent et al.
2009/0008611 A1    1/2009     Oriji et al.
2010/0189625 A1*   7/2010     Hisashi .................. B82Y 30/00
                                                          423/415.1

FOREIGN PATENT DOCUMENTS

| | | |
|---|---|---|
| JP | H01-270543 A | 10/1989 |
| JP | H03-056566 A | 3/1991 |
| JP | 2000-511864 A | 9/2000 |
| JP | 2005-239531 A | 9/2005 |
| JP | 2006-143532 A | 6/2006 |
| JP | 2006-282444 A | 10/2006 |
| JP | 2008-016769 A | 1/2008 |
| JP | 2008016769 A * | 1/2008 |
| JP | 2009-184849 A | 8/2009 |
| JP | 2010-043169 A | 2/2010 |
| JP | 2011-084844 A | 4/2011 |
| WO | 97/43116 A | 11/1997 |
| WO | 2004-035882 A2 | 4/2004 |
| WO | 2009-008516 A1 | 1/2009 |
| WO | 2010-098669 A | 9/2010 |

OTHER PUBLICATIONS

International search report issued with respect to application No. PCT/JP2012/076514, mail date is Dec. 11, 2012.
European Search Report issued with respect to application No. 12840758.2, mail date is May 8, 2015.

* cited by examiner

CARBON NANOFIBER AGGREGATE, THERMOPLASTIC RESIN COMPOSITION, AND METHOD FOR PRODUCING THERMOPLASTIC RESIN COMPOSITION

TECHNICAL FIELD

The present invention relates to a carbon nanofiber aggregate, a thermoplastic resin composition containing the carbon nanofiber aggregate, and a method for producing the thermoplastic resin composition.

BACKGROUND ART

A high-performance composite material produced by combining carbon nanofibers with a thermoplastic resin has been studied. For example, various attempts to granulate the carbon nanofibers have been performed in order to improve the bulk density of the carbon nanofibers (for example, Patent Documents 1 to 8).

PATENT DOCUMENT

Patent Document 1: Japanese Patent Application Laid-Open No. 01-270543
Patent Document 2: Japanese Patent Application Laid-Open No. 03-056566
Patent Document 3: Japanese Patent Application Laid-Open No. 2005-239531
Patent Document 4: Japanese Patent Application Laid-Open No. 2006-143532
Patent Document 5: Japanese Patent Application Laid-Open No. 2009-184849
Patent Document 6: Japanese Patent Application Laid-Open No. 2010-043169
Patent Document 7: International Publication No. WO2009/008516
Patent Document 8: Japanese Patent Application Laid-Open No. 2011-084844

SUMMARY OF THE INVENTION

Problems to be Solved by the Invention

However, since the carbon nanofibers have a low bulk density, and contain a large amount of air per unit volume, there is a problem that the carbon nanofibers are hardly mixed with a thermoplastic resin pellet or powder uniformly. For example, when the carbon nanofibers and the thermoplastic resin are extruded, there are a problem that the carbon nanofibers and the thermoplastic resin are separated as layers from each other, a problem that it is necessary to bring the carbon nanofibers into contact with the thermoplastic resin at a pressure higher than usual, and a problem that dispersibility of the carbon nanofibers is also poor, which cannot increase a volume of the carbon nanofibers to be filled. In addition, since the carbon nanofibers have a low bulk density, the carbon nanofibers have a problem that they are apt to be scattered and are difficult to treat. Thus, actually, suppression of the scatter, and improvements in dispersibility and filling property in the thermoplastic resin have not been sufficiently considered for a granulated material containing the conventional carbon nanofibers.

The present invention has been developed under the above described situation. It is an object of the present invention to provide a carbon nanofiber aggregate capable of suppressing scatter and having excellent dispersibility and filling property in a thermoplastic resin, and a resin composition containing the carbon nanofiber aggregate.

Means for Solving the Problems

The present inventors made a diligent study to solve the above problems, and obtained findings from control of a maximum void volume P1 (cm$^3$/g) at a pore diameter of 2,500 nm or more and 100,000 nm or less and a maximum void volume P2 (cm$^3$/g) at a pore diameter of 6 nm or more and less than 2,500 nm in pore distribution data measured by mercury porosimetry, for a carbon nanofiber aggregate. The present invention has been thus completed.

That is, the present invention is as follows.

[1]
A carbon nanofiber aggregate having
a maximum void volume P1 (cm$^3$/g) at a pore diameter of 2,500 nm or more and 100,000 nm or less and
a maximum void volume P2 (cm$^3$/g) at a pore diameter of 6 nm or more and less than 2,500 nm in pore distribution data measured by mercury porosimetry,
wherein the maximum void volume P1 and the maximum void volume P2 satisfy relationships of the following formulae (1) and (2).

$$0.01 \leq P1 \leq 1 \tag{1}$$

$$0 < P1/P2 \leq 3.3 \tag{2}$$

[2]
The carbon nanofiber aggregate according to [1], wherein the carbon nanofiber aggregate has a three-dimensionally assembled structure as a structure where carbon nanofibers contained in the carbon nanofiber aggregate are entangled with each other.

[3]
The carbon nanofiber aggregate according to [1] or [2], wherein the carbon nanofiber aggregate has
an integrating void volume Q1 (cm$^3$/g) at a pore diameter of 2,500 nm or more and 100,000 nm or less and
an integrating void volume Q2 (cm$^3$/g) at a pore diameter of 6 nm or more and less than 2,500 nm in the pore distribution data measured by the mercury porosimetry; and
wherein the integrating void volume Q1 and the integrating void volume Q2 satisfy a relationship of the following formula (3).

$$0.75 \leq Q2/(Q1+Q2) < 1 \tag{3}$$

[4]
The carbon nanofiber aggregate according to any one of [1] to [3], wherein the carbon nanofiber aggregate comprises
(A) carbon nanofibers and
(B) at least one selected from the group consisting of a modified rosin, a styrene-based resin, an olefin-based resin, and an acrylic acid-based resin; and
wherein a content of the carbon nanofiber aggregate having a particle size passing through a sieve having a nominal opening of more than 0.3 mm and 4.75 mm or less specified according to JIS Z8801-1 is 90% by mass or more.

[5]
The carbon nanofiber aggregate according to [4], wherein the carbon nanofiber aggregate comprises
100 parts by mass of the component (A),
0.1 to 50 parts by mass of the component (B) and
0.01 to 30 parts by mass of (C) a surfactant.

[6]

The carbon nanofiber aggregate according to [4] or [5], wherein a content of the component (B) based on 100 parts by mass of the component (A) is from 0.1 to 40 parts by mass.

[7]

A thermoplastic resin composition comprising a thermoplastic resin and the carbon nanofiber aggregate according to any one of [1] to [6].

[8]

The thermoplastic resin composition according to [7], wherein an L/D ratio of the carbon nanofiber in the thermoplastic resin composition is 50 or more.

[9]

The thermoplastic resin composition according to [8], wherein when a slice is cut out from each ten pellets formed from the thermoplastic resin composition by a microtome and slices are observed in a viewing angle of 200 μm×200 μm with an optical microscope (400 times), all long axes of the carbon nanofiber aggregates observed in an observed area of the optical microscope are less than 10 μm.

[10]

A method for producing a thermoplastic resin composition, the method comprising the step of melting and kneading a thermoplastic resin and the carbon nanofiber aggregate according to any one of [1] to [6] to provide the thermoplastic resin composition.

Advantageous Effects of the Invention

The present invention can provide a carbon nanofiber aggregate capable of suppressing scatter and having excellent dispersibility and filling property in a thermoplastic resin.

MODES FOR CARRYING OUT THE INVENTION

Figure 1:
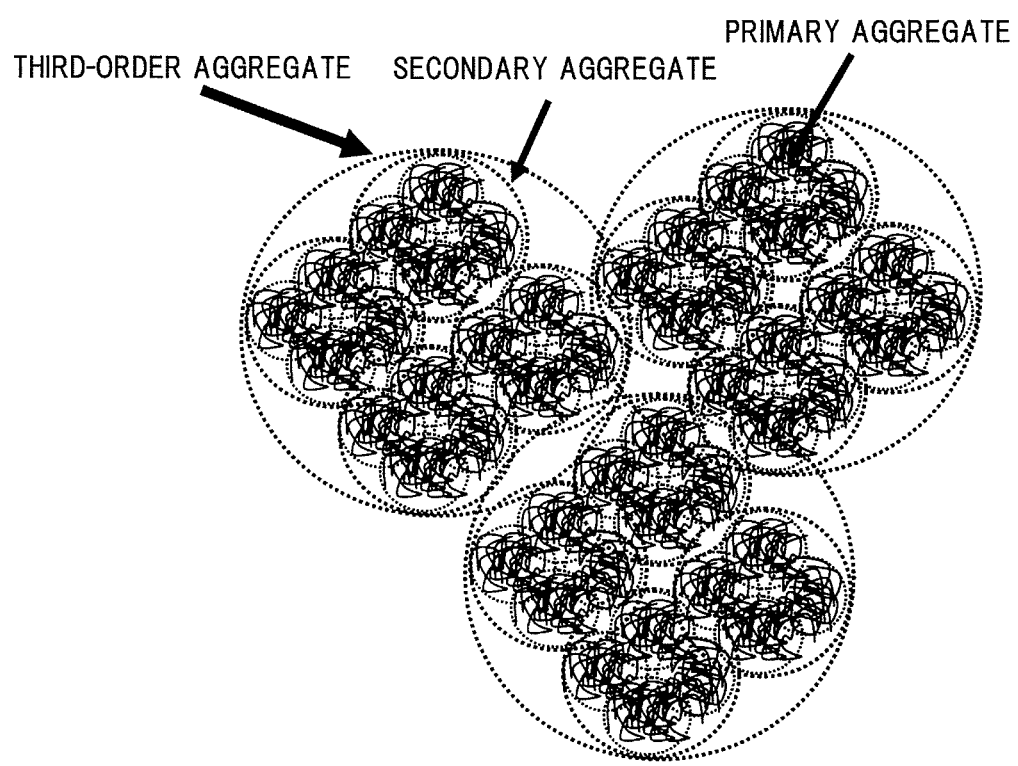
FIG. 1 shows a conceptual diagram for illustrating an aggregate structure of a suitable configuration example of a carbon nanofiber aggregate of the present embodiment.

Hereinafter, a mode for carrying out the present invention (hereinafter, merely referred to as "present embodiment") will be described in detail. The following present embodiment is given in order to illustrate the present invention. The present invention should not be construed to be limited to the following contents. The present invention may be carried out while making appropriate modification within the scope of the invention.

A carbon nanofiber aggregate of the present embodiment has a maximum void volume P1 ($cm^3/g$) at a pore diameter of 2,500 nm or more and 100,000 nm or less and a maximum void volume P2 ($cm^3/g$) at a pore diameter of 6 nm or more and less than 2,500 nm in pore distribution data measured by mercury porosimetry. The maximum void volume P1 and the maximum void volume P2 satisfy relationships of the following formulae (1) and (2).

$$0.01 \leq P1 \leq 1 \quad (1)$$

$$0 < P1/P2 \leq 3.3 \quad (2)$$

The present inventors made a diligent study in order to improve dispersibility or the like in a thermoplastic resin. In this case, the present inventors studied not only the macro structure of the carbon nanofiber aggregate but also the micro structure thereof, and found that control of a void structure indicated by pore volume distribution determined by mercury porosimetry measurement is unexpectedly effective in an improvement in dispersibility. As a result of further making a diligent study, the present inventors found that the carbon nanofiber aggregate having excellent dispersibility and filling property is provided by performing a control so as to attain a void structure where the above maximum void volumes P1 and P2 satisfy the relationships of formulae (1) and (2).

Although the reason is unclear, the reason is presumed as follows. When the carbon nanofiber aggregate and the thermoplastic resin are melted and kneaded, the void structure where the maximum void volumes P1 and P2 satisfy the relationships of formulae (1) and (2) makes it possible for fibers to be dispersed in the thermoplastic resin in a state where the fibers are loosened. Furthermore, a shearing force generated while melting and kneading is also applied, which enables not only excellent dispersibility but also high filling of the carbon nanofiber aggregate to the thermoplastic resin. Furthermore, this can prevent breaking of carbon nanofibers of the carbon nanofiber aggregate while melting and kneading, and thereby the lengths of the carbon nanofibers can be maintained. Furthermore, a composite material having the carbon nanofiber aggregate highly filled with sufficient dispersibility can be provided. Thereby, improvements in various physical properties of the composite material depending on the intended use can also be expected (the mechanism of the present embodiment is not limited thereto).

The carbon nanofiber aggregate of the present embodiment preferably has a three-dimensionally assembled structure as a structure where the carbon nanofibers contained in the carbon nanofiber aggregate are entangled with each other. Herein, the three-dimensionally assembled structure includes a structure of a secondary aggregate (secondary aggregate structure) collectively constituted by bringing a plurality of primary aggregates to be described later (the structure where the carbon nanofibers are entangled with each other) into contact with each other or by entangling the primary aggregates; and a high-order aggregate structure such as a structure of a third-order aggregate (third aggregate structure) further collectively constituted by a plurality of secondary aggregates. The dispersion state of the carbon nanofibers of the present embodiment can be observed also with a measuring method described in Example to be described later.

In the pore distribution data obtained by measuring the carbon nanofiber aggregate by the mercury porosimetry, an integrating void volume Q1 ($cm^3/g$) at a pore diameter of 2,500 nm to 100,000 nm and an integrating void volume Q2 ($cm^3/g$) at a pore diameter of 6 nm or more and less than 2,500 nm more preferably satisfy a relationship of the following formula (3).

$$0.75 \leq Q2/(Q1+Q2) < 1 \quad (3)$$

Herein, the integrating void volume means an integrated value of volumes of pore diameter ranges of the pore distribution measured by the mercury porosimetry. The integrating void volumes Q1 and Q2 can be obtained by a method described in Examples described later.

Herein, a case where the integrating void volumes Q1 and Q2 satisfy the relationship of the above formula (3) will be described with reference to FIG. 1. FIG. 1 is a conceptual diagram for illustrating an aggregate structure of a suitable configuration example of the carbon nanofiber aggregate of the present embodiment. FIG. 1 schematically illustrates an example of the aggregate structure of the suitable configuration example. Needless to say, the aggregate structure of the carbon nanofiber aggregate of the present embodiment is not limited to the illustrated content. In the carbon nanofiber aggregate, the integrating void volume Q1 at the pore diameter of 2,500 to 100,000 nm is considered to correspond to large voids constituted between the third-order aggregates shown in FIG. 1. The integrating void volume Q2 at the pore diameter of 6 nm or more and less than 2,500 nm is considered to correspond to (i) voids in the primary aggregate formed by entangling the fibers with each other; (ii) voids in the secondary aggregate containing a plurality of primary aggregates; and (iii) voids in the third-order aggregate containing a plurality of secondary aggregates. The integrating void volumes Q1 and Q2 are controlled so that the relationship of formula (3) is satisfied. Therefore, when the carbon nanofiber aggregate and the thermoplastic resin are melted and kneaded, the melted resin can enter into fine voids such as (i) the voids in the primary aggregate and (ii) the voids in the secondary aggregate, which can further improve dispersibility. Conventionally, the control of the micro structure such as the integrating void volume is not considered. Also from this viewpoint, the present embodiment is considered to be able to attain improvements in various physical properties including excellent nonconventional dispersibility (the mechanism of the present embodiment is not limited thereto).

When Q1 and Q2 satisfy the relationship of formula (3), the electrical conductivity of the carbon nanofiber aggregate is further excellent. From the viewpoint of providing the carbon nanofiber aggregate, the average fiber diameter of the carbon nanofibers as the raw material is preferably 30 nm or less, and more preferably 15 nm or less.

The average fiber diameter of the carbon nanofibers contained in the carbon nanofiber aggregate of the present embodiment is usually from 1 nm to 500 nm, preferably from 5 nm to 200 nm, and more preferably from 8 nm to 150 nm. The dispersibility of the carbon nanofiber aggregate can be further improved by setting the lower limit of the average fiber diameter to the above value. The mechanical physical properties of a thermoplastic resin composition can be further improved by setting the upper limit of the average fiber diameter to the above value. Herein, the average fiber diameter is measured by a scanning electron microscope.

The average fiber length of the carbon nanofibers contained in the carbon nanofiber aggregate of the present embodiment is usually tens of nanometers to thousands of micrometers, preferably from 0.5 µm to 500 µm, and more preferably from 1 µm to 100 µm. The mechanical physical properties and electrical conductivity of the thermoplastic resin composition can be further improved by setting the lower limit of the average fiber length to the above value. The dispersibility of the carbon nanofibers of the thermoplastic resin composition can be further improved by setting the upper limit of the average fiber length to the above value.

The carbon nanofiber aggregate of the present embodiment preferably contains (A) the carbon nanofibers, and (B) at least one selected from the group consisting of a modified rosin, a styrene-based resin, an olefin-based resin, and an acrylic acid-based resin. As a method for producing such a carbon nanofiber aggregate, a method comprising wet-mixing the component (B) with the powdered carbon nanofibers, and thereafter drying the mixture is preferable. This method is likely to produce a specific void structure for the entanglement of the carbon nanofibers.

Figure 2:
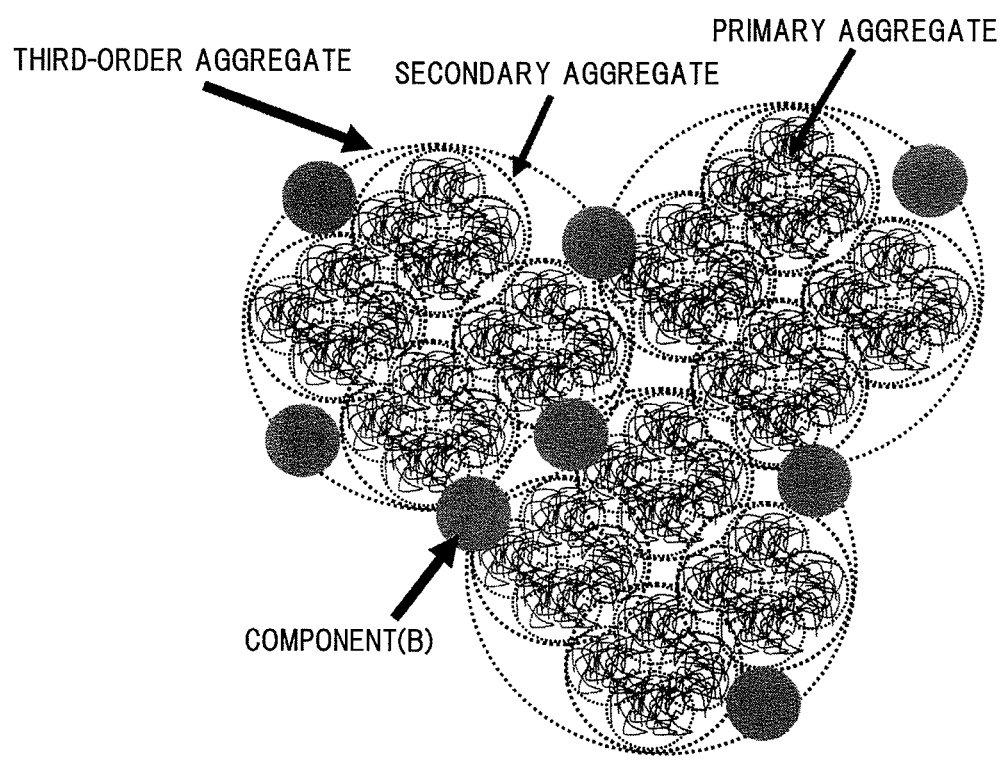
FIG. 2 shows a conceptual diagram for illustrating an aggregate structure, of another example of the suitable configuration example of the carbon nanofiber aggregate of the present embodiment.

Herein, the aggregate structure of the carbon nanofiber aggregate containing the component (B) will be described with reference to FIG. 2. FIG. 2 shows a conceptual diagram for illustrating an aggregate structure of another example of the suitable configuration example of the carbon nanofiber aggregate of the present embodiment. FIG. 2 schematically illustrates an example of the aggregate structure of the suitable configuration example. Needless to say, the aggregate structure of the carbon nanofiber aggregate of the present embodiment is not limited to the illustrated content. In FIG. 2, the carbon nanofiber aggregate has a structure where the third-order aggregates are more firmly connected by the component (B), and thereby the specific aggregate described in FIG. 1 or the like can be more firmly maintained. Furthermore, the component (B) is disposed only on the boundary between the third-order aggregates, and does not enter into finer voids or the like. Thereby, the melted resin can enter into fine voids such as (i) the voids in the primary aggregate and (ii) the voids in the secondary aggregate at a higher filling rate. As a result, dispersibility is presumed to be able to be further improved (the mechanism of the present embodiment is not limited thereto).

As described above, an organic substance such as the component (B) is presumed to play a role of connecting the carbon nanofibers to each other by a chemical bond or a physical bond. From this viewpoint, it is preferable that the component (B) forming a covalent bond with the component (A) at both ends of a molecular chain thereof is not used. For example, the component (B) substantially having neither peroxide nor an azo compound at both ends of a molecular chain thereof is preferable.

Examples of the modified rosin may include, but not particularly limited to, one obtained by reacting at least one rosin selected from the group consisting of a tall rosin, a gum rosin, and a wood rosin with a modifying agent. Examples of the modifying agent may include α,β-unsaturated carboxylic acids, polyhydric alcohols, and phenols. Among these, α,β-unsaturated carboxylic acids are preferable. These modifying agents may be used singly or in combination of two or more. For example, when not only the α,β-unsaturated carboxylic acids but also the polyhydric alcohols or the phenols are used in combination, these may be simultaneously or sequentially reacted with the rosin.

Examples of the α,β-unsaturated carboxylic acids may include, but not particularly limited to, acrylic acid, methacrylic acid, fumaric acid, maleic acid, maleic anhydride, itaconic acid, itaconic acid anhydride, citraconic acid, and citraconic acid anhydride.

Examples of the polyhydric alcohols may include, but not particularly limited to, divalent alcohols such as ethylene glycol, propylene glycol, neopentadiol, tetramethylene glycol, and 1,3-butanediol; trivalent alcohols such as glycerin and pentaerythritol; and amino alcohols such as triethanolamine and tripropanolamine.

Examples of the styrene-based resin may include, but not particularly limited to, polystyrene, a styrene-maleic acid copolymer, a styrene-maleic anhydride copolymer, a styrene-maleimide copolymer, a styrene-butadiene copolymer, a styrene-butadiene-acrylate copolymer, a styrene-butadiene-methacrylate copolymer, and modified substances thereof. In the case of a copolymer containing a monomer other than styrene, the content of styrene is preferably 50% by mass or more.

Examples of the olefin-based resin may include, but not particularly limited to, polyethylene, an ethylene-maleic acid copolymer, an ethylene-maleic anhydride copolymer, an ethylene-maleimide copolymer, an ethylene-acrylate copolymer, an ethylene-ethyl acrylate copolymer, maleic acid-modified polyethylene, maleic anhydride-modified polyethylene, polypropylene, maleic acid-modified polypropylene, and maleic anhydride-modified polypropylene. In the case of a copolymer containing a monomer other than olefin, the total content of olefin is preferably 50% by mass or more.

Examples of the acrylic acid-based resin may include, but not particularly limited to, an acrylic acid homopolymer, an acrylic acid-acrylic ester copolymer, an acrylic acid-butyl copolymer, an acrylic acid-maleic acid copolymer, and modified substances thereof. In the case of a copolymer containing a monomer other than acrylic acid, the total content of acrylic acid is preferably 50% by mass or more.

An example of an analysis method when the carbon nanofiber aggregate of the present embodiment contains a resin as the component (B) will be described. First, a resin component contained in the carbon nanofiber aggregate is identified by subjecting the carbon nanofiber aggregate to IR measurement. A solvent capable of dissolving the resin is selected, and the resin is dissolved in the solvent, to produce a solution. The component (B) can be identified by separating the solution into a soluble component and an insoluble component, and subjecting the insoluble component to analyses such as IR measurement, NMR measurement, and heat decomposition mass spectrometry measurement.

From the viewpoint of the aggregation of (A) the carbon nanofibers and the dispersibility of the carbon nanofiber aggregate in the thermoplastic resin, the sum of the content of the component (B) based on 100 parts by mass of the component (A) is preferably from 0.1 to 50 parts by mass, more preferably from 0.1 to 40 parts by mass, and still more preferably from 0.5 to 30 parts by mass.

The component (B) is preferably emulsified. It is presumed that when the component (B) is emulsified, it enables more firm connection of the above third-order aggregates. The method for emulsifying the component (B) is not particularly limited. However, a method for emulsifying the component (B) using a surfactant (C) is preferable. From this viewpoint, the carbon nanofiber aggregate of the present embodiment preferably contains (A) the carbon nanofibers, (B) at least one selected from the group consisting of the modified rosin, the styrene-based resin, the olefin-based resin, and the acrylic acid-based resin, and (C) the surfactant.

Examples of the emulsifying method may include, but not particularly limited to, a solvent type emulsifying method, a solventless type emulsifying method, and a phase inversion emulsifying method. The carbon nanofiber aggregate of the present embodiment is preferably produced by mixing (wet-mixing or the like) the component (A) with an emulsion of the component (B), for example. The emulsion of the component (B) is more preferably obtained by emulsifying the component (B) by the component (C).

Examples of the component (C) may include, but not particularly limited to, an anionic surfactant, a nonionic emulsifying agent, an amphoteric emulsifying agent, and a synthetic polymer-based emulsifying agent.

Examples of the anionic surfactant may include, but not particularly limited to, fatty acids such as sodium stearate, sodium oleate, and sodium lauryl sulfate, sodium dodecylbenzenesulfonate, and sodium dodecyldiphenyletherdisulfonate.

Examples of the nonionic surfactant may include, but not particularly limited to, polyoxyethylene alkyl (or alkenyl) ethers, polyethylene alkyl phenyl ethers, sorbitan higher fatty acid esters, polyoxyethylene higher fatty acid esters, glycerin higher fatty acid esters, and a polyoxyethylene-polyoxypropylene block polymer.

Examples of the amphoteric surfactant may include, but not particularly limited to, aminocarboxylic acid, imidazoline betaine, carboxybetaine, sulfobetaine, and a sulfated•sulfonated adduct of a condensed product of (ethylene oxide or propylene oxide) and (alkylamine or diamine).

Examples of the synthetic polymer-based surfactant may include, but not particularly limited to, a water dispersible polymer. The water dispersible polymer is obtained by treating a polymer obtained by polymerizing two or more polymerization monomers (for example, styrene, acrylic acid, acrylic ester, and α-methylstyrene, vinyltoluene, maleic acid, acrylamide, vinyl acetate, styrene sulfonic acid, isoprene sulfonic acid, vinylsulfonic acid, allylsulfonic acid, and 2-(meth)acrylamide-2-methylpropanesulfonic acid or the like), with alkalis (for example, sodium hydroxide, potassium hydroxide, and ammonia or the like), to form a salt, and dispersing or dissolving the salt in water.

From the viewpoint of emulsifying the component (B), the carbon nanofiber aggregate of the present embodiment preferably contains 100 parts by mass of the component (A), from 0.1 to 50 parts by mass of the component (B), from 0.01 to 30 parts by mass of the surfactant as the component (C). The carbon nanofiber aggregate more preferably contains 100 parts by mass of the component (A), from 0.1 to 40 parts by mass of the component (B), and from 0.01 to 20 parts by mass of the component (C). When the contents of the components (A), (B), and (C) are set to the above range, particles containing the carbon nanofibers, the component (B) and the component (C) can be efficiently connected to obtain the carbon nanofiber aggregate. When the thermoplastic resin and the carbon nanofiber aggregate are melted and kneaded, the melted resin can also further penetrate into the voids of the carbon nanofiber aggregate. Furthermore, a shearing force generated when the thermoplastic resin and the carbon nanofiber aggregate are melted and kneaded is also applied, and thereby the carbon nanofibers can also be dispersed in the thermoplastic resin in a state where the carbon nanofibers are loosened. As a result, the thermoplastic resin can be highly filled with the carbon nanofibers with sufficient dispersibility. Furthermore, the shortening of the fiber lengths of the carbon nanofibers as the raw material can also be prevented when the thermoplastic resin and the carbon nanofiber aggregate are melted and kneaded.

The average particle diameter of the emulsion of the component (B) is preferably from 0.05 to 5 µm, and more preferably from 0.1 to 1 µm. In order to set the average particle diameter to the value, conditions such as the kind and amount of the surfactant used when the emulsion is prepared, and a stirring force to the solution may be appropriately adjusted. Herein, the average particle diameter means a volume average particle diameter. The volume average particle diameter can be measured by a laser diffraction scattering method particle size distribution measuring instrument. The emulsion particles as the component (B) are preferably spherical.

In the present embodiment, the value of P1 in formula (1) can be further controlled also by adjusting the average particle diameter of the emulsion, for example. There is a tendency that the value of P1 can be increased when using an emulsion having a small average particle diameter, for example. There is a tendency that the value of P1 can be decreased when using an emulsion having a large average particle diameter. When the average particle diameter of the emulsion of the component (B) is set to 5 μm or less, there is a tendency that the value of P1 is increased, and the emulsion particles of the component (B) can be disposed only in the voids between the third-order aggregates of the carbon nanofibers. This can suppress the entering of the emulsion particles of the component (B) into voids formed by the secondary aggregates equivalent to the integrating void volume Q2, voids formed by the primary aggregates, and voids of the primary aggregates. As a result, a more suitable spacial configuration of the carbon nanofibers can be attained. Thereby, when the carbon nanofiber aggregate of the present embodiment and the thermoplastic resin are melted and kneaded, the dispersibility of the carbon nanofiber aggregate in the thermoplastic resin can be further improved (the mechanism of the present embodiment is not limited thereto).

The value of P1/P2 in formula (2) can be further controlled by adjusting the average particle diameter of the emulsion, the average fiber diameter of the carbon nanofibers, and the amount of the component (B) to be formulated. For example, there is a tendency that the value of P1/P2 can be increased when using the emulsion having a small average particle diameter. There is a tendency that the value of P1/P2 can be decreased when using the emulsion having a large average particle diameter. When the content of the component (B) based on 100 parts by mass of the carbon nanofibers is set to 50 parts by mass or less, this can suppress the entering of the emulsion particles of the component (B) into voids formed by the secondary aggregates equivalent to the integrating void volume Q2, voids formed by the primary aggregates, and voids of the primary aggregates. As a result, a more suitable spacial configuration of the carbon nanofibers can be attained. Thereby, when the carbon nanofiber aggregate of the present embodiment and the thermoplastic resin are melted and kneaded, the dispersibility of the carbon nanofiber aggregate in the thermoplastic resin can be further improved (the mechanism of the present embodiment is not limited thereto).

The value of Q2/(Q1+Q2) in formula (3) can be further controlled by adjusting the average particle diameter of the emulsion and the amount of the component (B) to be formulated. For example, there is a tendency that the value of Q2/(Q1+Q2) can be increased when using the emulsion having a small average particle diameter. There is a tendency that the value of Q2/(Q1+Q2) can be decreased when using the emulsion having a large average particle diameter. When the content of the component (B) based on 100 parts by mass of the carbon nanofibers is set to 50 parts by mass or less, this can suppress the entering of the component (B) into voids formed by the secondary aggregates equivalent to the integrating void volume Q2, voids formed by the primary aggregates, and voids of the primary aggregates. Therefore, there is a tendency that the value of Q1 is decreased, and the value of Q2 can be maintained at the value of Q2 of the carbon nanofibers as the raw material. When the average particle diameter of the emulsion is 0.05 μm or more, there is a tendency that the value of Q1 is decreased. Thereby, when the carbon nanofiber aggregate of the present embodiment and the thermoplastic resin are melted and kneaded, the dispersibility of the carbon nanofiber aggregate in the thermoplastic resin can be further improved (the mechanism of the present embodiment is not limited thereto).

The carbon nanofiber aggregate of the present embodiment is preferably produced by a wet-mixing method using the components (A) and an emulsion containing the components (B) and (C), for example. Examples of the method for producing the carbon nanofiber aggregate containing the components (A), (B), and (C) may include the following method. Raw materials such as the components (A), (B), and (C) are wet-mixed using a high-speed stirrer such as a Henschel type mixer or a super mixer; a ball mill; a paint shaker; a blender such as a roller type kneading machine, a single-screw extruder, or a multi-screw extruder, for example, a twin-screw extruder; a mixer; and a medium mill. The obtained mixture is granulated and molded by an extruder, a compression molding machine, a stirrer, and a fluidized bed granulator or the like, and dried by a dryer or a heater, to produce the carbon nanofiber aggregate. Mixers providing a high shearing force such as the high-speed stirrer such as the Henschel type mixer or the super mixer, and the multi-screw extruder, for example, the twin-screw extruder are particularly preferably used.

In the carbon nanofiber aggregate of the present embodiment, the content rate of the carbon nanofiber aggregate having a particle size passing through a sieve having a nominal opening specified according to JIS Z8801-1 of more than 0.3 mm and 4.75 mm or less is preferably 90% by mass or more, and more preferably 93% by mass or more. Specifically, the carbon nanofiber aggregate is sieved for classification, which results in a further improvement in dispersibility of the carbon nanofiber aggregate in the thermoplastic resin to be described later. From this viewpoint, particularly, the content rate of the carbon nanofiber aggregate containing the components (A) and (B) and having a particle size passing through a sieve having a nominal opening specified according to JIS Z8801-1 of more than 0.3 mm and 4.75 mm or less is more preferably 90% by mass or more.

<Thermoplastic Resin Composition>

The above carbon nanofiber aggregate can be formulated with the thermoplastic resin, to produce the thermoplastic resin composition. Particularly, the carbon nanofiber aggregate of the present embodiment can exhibit excellent dispersibility which cannot be attained by the composite material of the conventional carbon nanofibers and the thermoplastic resin. Thereby, the thermoplastic resin composition also can exhibit more excellent performance. These thermoplastic resin compositions have excellent physical properties such as a mechanical property, an electrical property, and a heat conduction property. Hereinafter, the thermoplastic resin composition of the present embodiment will be described.

The content of the above carbon nanofiber aggregate in the thermoplastic resin composition of the present embodiment is not particularly limited. However, the content of the carbon nanofiber aggregate based on 100 parts by mass of the thermoplastic resin is preferably 0.01 to 80 parts by mass, more preferably from 0.5 to 70 parts by mass, and still more preferably from 1 to 40 parts by mass. An elastic modulus as the mechanical property, the electrical conductivity as the electrical property, and the thermal conductivity or the like can be further improved without largely degrading moldability and toughness by setting the content of the carbon nanofiber aggregate to the above range.

The lower limit of the content of the carbon nanofiber aggregate is preferably 0.05 parts by mass or more, more preferably 0.1 parts by mass or more, still more preferably 0.5 parts by mass or more, and yet still more preferably 1 part by mass or more. When the lower limit of the content of the carbon nanofiber aggregate is set to the above range, the electrical conductivity can be easily imparted while the moldability and mechanical property of the thermoplastic resin as a matrix are held.

Examples of the thermoplastic resin may include, but not particularly limited to, a styrene-based resin, an olefin-based resin, a polyester-based resin, a polycarbonate-based resin, an acrylic acid-based resin, a polyamide-based resin, an ABS resin, a modified PPE resin, a fluorine-based resin, a thermoplastic polyimide resin, aromatic polyether ketone, and a rubber-based resin. Among these, from the viewpoint of economical efficiency and general versatility or the like, the polyamide-based resin and the polyolefin-based resin are preferable. When the styrene-based resin, the olefin-based resin, and the acrylic acid-based resin are used as the component (B), these are the components of the above carbon nanofiber aggregate. It is clear that the resins can be distinguished from the above thermoplastic resin.

Specific examples of the styrene-based resin may include polystyrene. Specific examples of the olefin-based resin may include polyethylene, polypropylene, an ethylene-propylene copolymer, and an ethylene-vinylacetate copolymer. Specific examples of the polyester-based resin may include polyethylene terephthalate, polymethylene terephthalate, and polybutylene terephthalate. Specific examples of the polycarbonate-based resin may include polycarbonate and a polycarbonate-ABS alloy resin. Specific examples of the acrylic acid resin may include polymethylmethacrylate, an acrylic acid-acrylic ester copolymer. Specific examples of the polyamide-based resin may include polyamide (PA) 6, PA11, PA12, PA66, PA610, PA6T, PA6I, and PA9T. Specific examples of the modified PPE resin may include a polymer alloy of PPE and any one selected from the group consisting of polystyrene, polyamide and polypropylene. Specific examples of the fluorine-based resin may include polytetrafluoroethylene, polychlorotrifluoroethylene, polyvinylidene fluoride, a perfluoroalkoxy fluorine resin, an ethylene tetrafluoride-propylene hexafluoride copolymer, and an ethylene-ethylene tetrafluoride copolymer. Specific examples of the rubber-based resin may include a styrene-based thermoplastic elastomer, a polyolefin-based thermoplastic elastomer, a polyamide-based thermoplastic elastomer, a polyester-based thermoplastic elastomer, and a thermoplastic polyurethane elastomer.

The thermoplastic resin composition of the present embodiment may further contain components other than the carbon nanofiber aggregate and the thermoplastic resin.

The L/D ratio of the carbon nanofiber contained in the thermoplastic resin composition of the present embodiment can be set to 50 or more. The L/D ratio is a ratio (L/D) of the average fiber length (L) of the carbon nanofibers to the average fiber diameter (D) of the carbon nanofibers. Herein, the average fiber length means a weight average length. The average fiber diameter and the average fiber length can be determined according to the following method. First, a resin composition to be measured is added to a solvent, to produce a dispersed solution thereof or a dispersed solution of a residue obtained by thermally decomposing only the resin. The dispersed solution is filtered and dried to obtain a measurement sample. The measurement sample is observed with a scanning electron microscope or a transmission electron microscope, and the observed image is statistically analyzed. Thereby, the average fiber diameter and the average fiber length can be obtained.

Conventionally, the dispersion state or the like of the carbon nanofibers is not sufficiently controlled. This causes a problem that the carbon nanofibers are apt to be broken or damaged when the carbon nanofibers and the thermoplastic resin are kneaded. Therefore, there is a tendency that a problem of difficult maintenance of a high L/D ratio is apt to be caused. However, the present embodiment uses the carbon nanofiber aggregate having excellent dispersibility in the thermoplastic resin, which does not cause the problem.

As for the state of the carbon nanofiber aggregate in the thermoplastic resin composition, when a slice is cut out from each ten pellets formed from the thermoplastic resin composition by a microtome and slices are observed in a viewing angle of 200 μm×200 μm with an optical microscope (400 times), all long axes of the carbon nanofiber aggregates observed in an observed area of the optical microscope are preferably less than 10 μm. When such a dispersion state is attained in the thermoplastic resin composition, various physical properties including the electrical property as the composite material of the thermoplastic resin and the carbon nanofiber aggregate can be improved.

The method for producing the thermoplastic resin composition of the present embodiment preferably includes a step of melting and kneading the carbon nanofiber aggregate and the thermoplastic resin to obtain the thermoplastic resin composition. Specific examples may include a method including the steps of mixing the carbon nanofiber aggregate and the thermoplastic resin in a mixer or by manual mixing in a bag, and thereafter heating, melting, and kneading the carbon nanofiber aggregate and the thermoplastic resin in a kneader; a batch type kneading machine such as a Bambari type mixer; a roll type kneading machine; a single-screw extruder; and a multi-screw extruder such as a twin-screw extruder. The composite material of the conventional carbon nanofibers and the thermoplastic resin makes it difficult to form a good dispersion state of the carbon nanofibers in the thermoplastic resin. However, the above excellent dispersion state can be constituted only by kneading the carbon nanofiber aggregate and the thermoplastic resin according to the simple kneading method using the carbon nanofiber aggregate of the present embodiment. The carbon nanofiber aggregate and the thermoplastic resin are preferably heated, melted, and kneaded by the batch type kneading machine such as the kneader, and the multi-screw extruder such as the twin-screw extruder as the method for producing the thermoplastic resin composition of the present embodiment.

In the carbon nanofiber aggregate obtained by the above method, the above emulsion particles or the like are presumed to preferentially enter into not the voids of the primary aggregate structure and secondary aggregate structure of the carbon nanofiber aggregate but the voids between the third-order aggregate structures. Therefore, when the melted thermoplastic resin and the carbon nanofiber aggregate are mixed, the thermoplastic resin can easily penetrate into the voids of the carbon nanofiber aggregate. This enables the high filling of the carbon nanofiber aggregate. Furthermore, it is presumed that the carbon nanofiber aggregate can be dispersed in the thermoplastic resin composition by applying the shearing force when the thermoplastic resin and the carbon nanofiber aggregate are melted and kneaded (the mechanism of the present embodiment is not limited thereto).

EXAMPLES

Hereinafter, the present invention will be described in detail with reference to Examples and Comparative Examples. However, the present invention is not limited to these examples in any way. The following raw materials were used in Examples.

[Component (A)]
(1) Multilayer carbon nanofibers having average fiber diameter of 150 nm ("VGCF" (trade name) manufactured by Showa Denko K.K.)
(2) Multilayer carbon nanofibers having average fiber diameter of 80 nm ("VGCF-S" (trade name) manufactured by Showa Denko K.K.)
(3) Multilayer carbon nanofibers having average fiber diameter of 15 nm ("VGCF-X" (trade name) manufactured by Showa Denko K.K.)

[Component (B)]
(1) Modified rosin ("135GN" (trade name) manufactured by Harima Chemicals, Inc.)
(2) Styrene-ethylene butylene-styrene copolymer (SEBS; "Tuftec H1041" (trade name) manufactured by Asahi Kasei Chemicals Corporation)
(3) Amine-modified styrene-ethylene butylene-styrene copolymer (modified SEBS; "Tuftec MP-10" (trade name) manufactured by Asahi Kasei Chemicals Corporation)
(4) Polystyrene ("H77" (trade name) manufactured by PS Japan Corporation)
(5) Styrene-maleic anhydride copolymer ("SMA3000" (trade name) manufactured by Sartomer Japan; CRAY VALLEY)
(6) Esterified styrene-maleic anhydride copolymer ("SMA3840" (trade name) manufactured by Sartomer Japan; CRAY VALLEY)
(7) Ethylene-vinylacetate copolymer ("EV150" (trade name) manufactured by DuPont-Mitsui Polychemicals Co., Ltd.)
(8) Polyacrylic-based polymer (solvent type adhesive polymer; "Arontack S-1601" (trade name) manufactured by To a Gosei Chemical Co., Ltd.)
(9) Synthetic styrene-butadiene-based aqueous emulsion (synthetic SBR-based emulsion; to be described later)
(10) Synthetic acrylic-based aqueous emulsion (synthetic polyacrylic-based emulsion; to be described later)

[Component (C)]
Surfactant:
(1) "Newcol 2320-SN" (trade name) (manufactured by Nippon Nyukazai Co., Ltd., active component: 24%)
(2) Aqueous solution reagent containing 50% of sodium dodecylbenzenesulfonate (manufactured by Junsei Chemical Co., Ltd.)

[Thermoplastic Resin]
(1) Polyamide (PA; "Reona 1300S" (trade name) manufactured by Asahi Kasei Chemicals Corporation)
(2) Low density polyethylene (PE; "Suntec-LD F1920" (trade name) manufactured by Asahi Kasei Chemicals Corporation)
(3) Polypropylene (PP; "J707G" (trade name) manufactured by Prime Polymer Co., Ltd.)

[Resin Composition Containing Carbon Nanofibers (Production of Pellet)]
A pellet was produced, in which the amount of carbon nanofibers formulated based on a thermoplastic resin was 5% by mass. Polyamide, polyethylene, or polypropylene was used as the thermoplastic resin. A strand was obtained under the following conditions, and cut into pellets.

Kneading machine used: small laboratory kneading machine ("Xplore" manufactured by DSM Corporation)
A case where polyamide and carbon nanofibers were kneaded to produce a polyamide resin composition: a kneading temperature of 300° C., a kneading time of 2 minutes, and a rotation speed of 100 rpm
A case where polyethylene and carbon nanofibers were kneaded to produce a polyethylene resin composition: a kneading temperature of 180° C., a kneading time of 2 minutes, and a rotation speed of 100 rpm
A case where polypropylene and carbon nanofibers were kneaded to produce a polypropylene resin composition: a kneading temperature of 250° C., a kneading time of 2 minutes, and a rotation speed of 100 rpm

[Resin Composition Containing Carbon Nanofibers (Production of Molded Product for Evaluating Physical Properties)]
A dumbbell molded product of Type3 in accordance with ISO 37 was produced to be used as a molded product for evaluating physical properties. Specifically, the dumbbell molded product was produced in accordance with the following method.

First, a small injection molding machine jacket ("Xplore" manufactured by DSM Corporation) was connected to a strand outlet of the small laboratory kneading machine. The resin compositions (a polyamide resin composition, a polyethylene resin composition, or a polypropylene resin composition) in a melt state were injected into the small injection molding machine jacket. When the polyamide resin composition was injected into the small injection molding machine jacket, a jacket temperature was set to 300° C. When the polyethylene resin composition was injected into the small injection molding machine jacket, the jacket temperature was set to 200° C. When the polypropylene resin composition was injected into the small injection molding machine jacket, the jacket temperature was set to 250° C.

Next, the small injection molding machine jacket was removed from the small laboratory kneading machine, and the small injection molding machine jacket was placed in a mold of a dumbbell of Type3 in accordance with ISO 37. The resin composition in the small injection molding machine jacket was extruded into the mold using a pressure cylinder connected to a back part of the small injection molding machine jacket. The injection conditions were as follows. The dumbbell molded product thus obtained was used as the molded product for evaluating physical properties.

Injection pressure: 11 bar, injection time: 30 seconds
Mold temperature of polyamide resin composition: 80° C.
Mold temperature of polyethylene resin composition: 40° C.
Mold temperature of polypropylene resin composition: 40° C.

[Measurement of Void Volume or the Like (P1, P2, Q1, Q2)]
The void volume of the carbon nanofiber aggregate was measured by mercury porosimetry ("PoreMaster PM-33GT" manufactured by Quantachrome Corporation). A cell having a volume of 3 mL was filled with a measurement sample, and deaerated as pretreatment, followed by measurement.

In a range of a pore diameter having 3 to 100,000 nm, 70 or more data were measured. The obtained data were analyzed by "Quantachrome Poremaster for Windows (trademark) version 3.0" manufactured by Quantachrome Corporation.

P1 is a maximum peak value in a range of a pore diameter having 2,500 nm or more and 100,000 nm or less. P2 is a maximum peak value in a range of a pore diameter having 6 nm or more and less than 2,500 nm. Q1 is an integrating pore volume in a range of a pore diameter having 2,500 nm or more and 100,000 nm or less, and represents a void volume in the range. Q2 is an integrating pore volume in a range of a pore diameter having 6 nm or more and less than 2,500 nm, and represents a void volume in the range.

[Evaluation of Scatter of Carbon Nanofiber Aggregate]

Into a polyethylene bag (1L), 5 g of a carbon nanofiber aggregate was charged, and the bag was sealed. Then, the polyethylene bag was shaken to right and left at a rate of 50 times for 20 seconds with an amplitude of 50 cm. The floating state of the carbon nanofiber aggregate after the completion of shaking was visually observed. Scatter was evaluated according to the following standards.

G: a case where the flotage of the aggregate abated within 30 seconds

B: a case where the aggregate floated for 30 seconds or more

[Evaluation of Dispersibility of Carbon Nanofiber Aggregate]

For any ten pellets of the thermoplastic resin composition obtained above and containing 5% by mass of the carbon nanofiber aggregate, a super slice was cut out from each ten pellets by a microtome, to be used as observation samples. The observation samples were observed with an optical microscope (200 μm×200 μm; magnification ratio: 400 times). Dispersibility was evaluated based on the following standards.

A: In an observed area of the optical microscope, only the carbon nanofiber aggregates having a long axis having a length of less than 10 μm were observed (all long axes of the carbon nanofiber aggregates observed in the observed area of the optical microscope were less than 10 μm).

B: In the observed area of the optical microscope, the number of the carbon nanofiber aggregates having a long axis having a length of 10 μm or more and less than 30 μm was 10 or less.

C: In the observed area of the optical microscope, the number of the carbon nanofiber aggregates having a long axis having a length of 30 μm or more and less than 50 μm was 5 or less.

D: In the observed area of the optical microscope, the number of the carbon nanofiber aggregates having a long axis having a length of 50 μm or more was confirmed to be 1 or more.

[Measurement of Maximum Filling Rate to Polyamide Resin]

A maximum filling rate of the carbon nanofiber aggregate to a polyamide resin was determined in accordance with the following method.

First, the total amount of the polyamide resin composition was set to 3 kg. Next, the content of the carbon nanofiber aggregate in the polyamide resin composition was gradually increased. There was obtained the maximum filling volume of the carbon nanofiber aggregate until a continuous strand was not obtained when the polyamide resin composition was kneaded and extruded (temperature: 300° C., rotation speed: 250 rpm) by a twin-screw extruder ("KZW15", screw diameter: 15 mm, L/D ratio: 45, manufactured by Technovel Corporation). The maximum filling rate was obtained from the maximum filling volume based on the following formula.

Maximum filling rate(% by mass)=(maximum filling volume of carbon nanofiber aggregate(kg))/(total amount of polyamide resin composition(3 kg))×100

[Evaluation of Electrical Conductivity]

A polyamide resin composition pellet containing 2.5% by mass of the carbon nanofiber aggregate was prepared. Injection molding was performed under conditions of a screw rotation speed of 200 rpm, a resin temperature of 290° C., and a primary pressure time of 1.2 seconds using a flat plate mold (130 mm×130 mm×3 mm) set to 80° C. by a molding machine (IS150E manufactured by Toshiba Machine Co., Ltd.), to obtain a test specimen. The surface resistance value of the obtained test specimen was measured, to evaluate electrical conductivity. Copper plates having a square of 1 cm×1 cm were disposed at intervals of 1 cm on the test specimen. Leads from the copper plates were connected to a resistance measuring instrument ("R8340A type" manufactured by Advantest Corporation). The surface resistance value was measured by a direct-current two-terminal method. Three test specimens were prepared for measurement. The surface resistance value was measured at five places of each of the test specimens, to calculate the average value of a total of 15 measured values.

[Evaluation of Tensile Strength at Break and Tensile Elongation at Break]

A tensile strength at break and a tensile elongation at break were measured at a tension rate of 50 mm per minute under constant temperature and humidity of 23° C. and 50% in accordance with regulation of JIS K7161 (plastic-tensile property test method).

[Measurement of L/D Ratio of Carbon Nanofiber]

The L/D ratio of the carbon nanofiber contained in the resin composition was measured according to the following method. First, 0.1 g of the resin composition was added to 50 mL of a solvent. The solvent was left to dissolve a resin component. As the solvent, for example, hexafluoroisopropanol (HFIP) was used for polyamide 66 or polyethylene terephthalate; toluene was used for a styrene-based resin; and ethyl acetate was used for polycarbonate.

When an olefin-based resin such as polyethylene or polypropylene was hardly dissolved in the solvent, the following treatment was performed. The resin composition was thermally decomposed at 350° C. using an electric furnace under a nitrogen gas atmosphere, to obtain a residue. To 50 mL of xylene, 0.1 g of the obtained residue was added to obtain a solution.

The obtained solution was stirred in an ultrasonic bath for 20 minutes, and added dropwise onto a cellulose filter of 0.025 μm. The residual material left on the filter was naturally dried, to obtain a measurement sample. The obtained measurement sample was observed with appropriate use of a scanning electron microscope ("S-4700" manufactured by Hitachi High-Technologies Corporation) or a transmission electron microscope ("H-600" manufactured by Hitachi High-Technologies Corporation). The picked-up image was statistically analyzed by "Image-pro plus" (measurement number: 200). A ratio of a weight average length (L) to a carbon nanofiber diameter (D) was obtained as the L/D ratio.

Example 1

In 300 g of toluene, 100 g of a modified rosin was dissolved to prepare a toluene solution of the modified rosin. Separately, 900 mL of an aqueous solution in which a concentration of an active component in a surfactant ("Newcol 2320-SN" (trade name)) was 10% by mass was prepared. These were added into a toluene solution, stirred, and mixed for emulsification. This was further treated using a high-pressure emulsification apparatus (manufactured by Manton-Gaulin Corporation), to produce a finely emulsified product. The obtained finely emulsified product was heat-distilled under a reduced pressure under a condition of 100 mmHg, to remove toluene, thereby obtaining an organic emulsion having a volume average particle diameter of 0.3 µm. The volume average particle diameter was measured with reference to a laser diffraction scattering method. Specifically, the volume average particle diameter was obtained as D50 of particle size distribution by "SALD-300V" manufactured by Shimadzu Corporation.

Next, 100 g of carbon nanofibers ("VGCF" (trade name)) and water were charged into a Henschel mixer having a volume of 20 L, to set the volume to be about a half of that of the Henschel mixer.

The organic emulsion prepared above was added thereto so that a rate of a solid matter in the organic emulsion based on 100 parts by mass of the carbon nanofibers ("VGCF" (trade name)) was 10 parts by mass. These were stirred and mixed at a high rotation speed of 2000 rpm for 2 minutes.

The obtained mixture was slurry. This slurry was charged into a wet type extrusion granulator manufactured by Dalton Corporation, to obtain a cylindrical granulated material. The obtained granulated material was dried at 90° C. for 2 hours in an air blowing type dryer manufactured by Yamato Scientific Co., Ltd., to obtain a carbon nanofiber aggregate. The obtained carbon nanofiber aggregate was classified using a sieve having a nominal opening of 2.36 mm specified according to JIS Z8801-1. The carbon nanofiber aggregate passing through the sieve was further classified using a sieve having a nominal opening of 1.18 mm. The carbon nanofiber aggregate remaining on the sieve was vacuum-dried at 80° C., to obtain an intended carbon nanofiber aggregate.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 2

A carbon nanofiber aggregate was obtained in the same manner as in Example 1 except that "VGCF-S" was used as carbon nanofibers in place of "VGCF".

A resin composition was produced according to the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 3

A carbon nanofiber aggregate was obtained in the same manner as in Example 1 except that "VGCF-S" was used as carbon nanofibers in place of "VGCF"; SEBS was used in place of the modified rosin; and an organic emulsion having a volume average particle diameter of 0.5 µm was used.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 4

A carbon nanofiber aggregate was obtained in the same manner as in Example 1 except that "VGCF-X" was used as carbon nanofibers in place of "VGCF".

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 5

A carbon nanofiber aggregate was obtained in the same manner as in Example 1 except that "VGCF-X" was used as carbon nanofibers in place of "VGCF"; modified SEBS was used in place of the modified rosin; and an organic emulsion having a volume average particle diameter of 0.5 was used.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 6

A carbon nanofiber aggregate was obtained in the same manner as in Example 1 except that "VGCF-X" was used as carbon nanofibers in place of "VGCF"; PS was used in place of the modified rosin; and an organic emulsion having a volume average particle diameter of 0.5 μm was used.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 7

Figure 3:
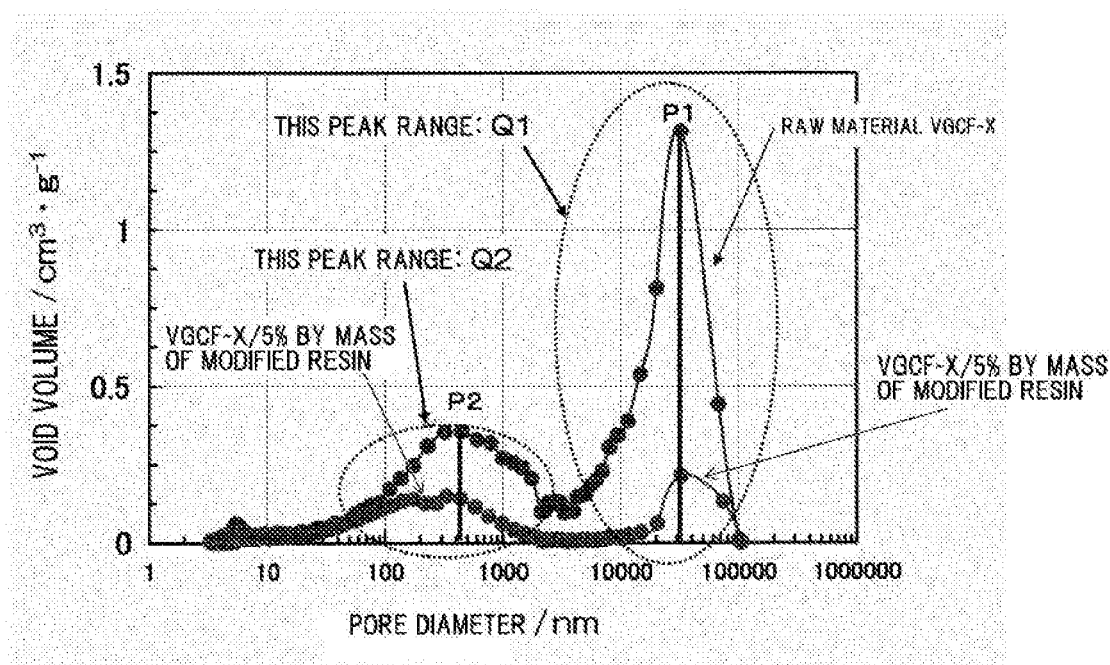
FIG. 3 shows a graph showing mercury porosimetry measurement results of raw material carbon nanofibers and a carbon nanofiber aggregate in Example 7.

A carbon nanofiber aggregate was obtained in the same manner as in Example 1 except that "VGCF-X" was used as carbon nanofibers in place of "VGCF"; and an organic emulsion (modified rosin) was formulated so that a rate of a solid matter in the organic emulsion based on 100 parts by mass of the carbon nanofibers was 5 parts by mass. A graph of mercury porosimetry measurement results of the carbon nanofibers as raw materials and the carbon nanofiber aggregate in Example 7 as an example is shown in FIG. 3.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 8

A carbon nanofiber aggregate was obtained in the same manner as in Example 1 except that "VGCF-X" was used as carbon nanofibers in place of "VGCF"; a modified SEBS was used in place of the modified rosin; an organic emulsion having a volume average particle diameter of 0.6 μm was used; and an organic emulsion (a modified SEBS) was formulated so that a rate of a solid matter in the organic emulsion based on 100 parts by mass of the carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 9

A carbon nanofiber aggregate was obtained in the same manner as in Example 1 except that "VGCF-X" was used as carbon nanofibers in place of "VGCF"; SEBS was used in place of the modified rosin; an organic emulsion having a volume average particle diameter of 0.6 μm was used; and an organic emulsion (SEBS) was formulated so that a rate of a solid matter in the organic emulsion based on 100 parts by mass of the carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 10

A carbon nanofiber aggregate was obtained in the same manner as in Example 1 except that "VGCF-X" was used as carbon nanofibers in place of "VGCF"; PS was used in place of the modified rosin; an organic emulsion having a volume average particle diameter of 0.6 μm was used; and an organic emulsion (PS) was formulated so that the amount of a solid matter in the organic emulsion based on 100 parts by mass of the carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 11

In place of the modified rosin, 100 g of a styrene-maleic anhydride copolymer was used, and dissolved in 300 g of propyl acetate, to produce a propyl acetate solution. Separately, 900 mL of an aqueous solution containing 10% by mass of an active component of sodium dodecylbenzenesulfonate was produced. The aqueous solution was added into the propyl acetate solution. These solutions were stirred and mixed for emulsification. Furthermore, this was treated by a high-pressure emulsification apparatus (manufactured by Manton-Gaulin Corporation) to produce a finely emulsified product. This finely emulsified product was heat-distilled under a reduced pressure under a condition of 100 mmHg, to remove a solvent, thereby obtaining an organic emulsion having a volume average particle diameter of 0.5 µm. A carbon nanofiber aggregate was obtained in the same manner as in Example 1 except that the organic emulsion was added so that a solid matter in the organic emulsion based on 100 parts by mass of carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 12

In place of the modified rosin, 100 g of an ethylene-vinylacetate copolymer was used. The ethylene-vinylacetate copolymer was added into 300 g of toluene, warmed to 60° C. and dissolved, to produce a toluene solution. Separately, 900 mL of an aqueous solution containing 10% by mass of an active component of sodium dodecylbenzenesulfonate was produced. The aqueous solution was added into the toluene solution. These solutions were stirred and mixed for emulsification. Furthermore, this was treated with use of a high-pressure emulsification apparatus (manufactured by Manton-Gaulin Corporation) to produce a finely emulsified product. This finely emulsified product was heat-distilled under a reduced pressure under a condition of 100 mmHg, to remove toluene, thereby obtaining an organic emulsion having a volume average particle diameter of 0.4 µm. A carbon nanofiber aggregate was obtained in the same manner as in Example 4 except that the organic emulsion was added so that a solid matter in the organic emulsion based on 100 parts by mass of carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Example 13

In place of the modified rosin, 100 g of an esterified styrene-maleic anhydride copolymer was used. The esterified styrene-maleic anhydride copolymer was added into 300 g of toluene, warmed to 60° C. and dissolved, to produce a toluene solution. Separately, 900 mL of an aqueous solution containing 10% by mass of an active component of sodium dodecylbenzenesulfonate was produced. The aqueous solution was added into the toluene solution. These solutions were stirred and mixed for emulsification. Furthermore, this was treated with use of a high-pressure emulsification apparatus (manufactured by Manton-Gaulin Corporation) to produce a finely emulsified product. This finely emulsified product was heat-distilled under a reduced pressure under a condition of 100 mmHg, to remove toluene, thereby obtaining an organic emulsion having a volume average particle diameter of 0.4 µm. A carbon nanofiber aggregate was obtained in the same manner as in Example 4 except that the organic emulsion was added so that a solid matter in the organic emulsion based on 100 parts by mass of carbon nanofibers was 5 parts by mass.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with reference to the above method. The resin composition was used to evaluate electrical conductivity.

Example 14

A toluene solution having a polyacrylic-based polymer solid matter concentration of 30% was produced. Separately, 900 mL of an aqueous solution containing 10% by mass of an active component of sodium dodecylbenzenesulfonate was produced. These solutions were stirred and mixed for emulsification. Furthermore, this was treated with use of a high-pressure emulsification apparatus (manufactured by Manton-Gaulin Corporation) to produce a finely emulsified product. This finely emulsified product was heat-distilled under a reduced pressure under a condition of 100 mmHg, to remove toluene, thereby obtaining an organic emulsion having a volume average particle diameter of 0.6 µm. A carbon nanofiber aggregate was obtained in the same manner as in Example 4 except that the organic emulsion was added so that a solid matter in the organic emulsion based on 100 parts by mass of carbon nanofibers was 5 parts by mass.

A resin composition was produced in the following manner using the obtained carbon nanofiber aggregate, and physical properties thereof were evaluated. First, a polyamide resin composition containing 95% by mass of polyamide and 5% by mass of the carbon nanofiber aggregate was produced in accordance with the above method, and used to evaluate dispersibility. Next, a polyamide resin composition containing 97.5% by mass of polyamide and 2.5% by mass of the carbon nanofiber aggregate was produced in accordance with the above method, and used to evaluate electrical conductivity.

Example 15

A seed water dispersion for emulsion polymerization was synthesized according to the following method. The contents of a temperature adjustable reactor equipped with a stirrer were previously purged with nitrogen. Thereafter, into 170 parts by mass of ion-exchanged water (hereinafter, based on part by mass unless otherwise noted, but based on part by mass after drying except for ion-exchanged water, an unsaturated monomer, and a chain transfer agent), 10 parts by mass of sodium dodecylbenzenesulfonate, 0.1 parts by mass of sodium hydroxide, and 2.5 parts by mass of sodium persulfate were added. These were stirred at 40° C. Then, to the mixture, 45 parts by mass of styrene, 50 parts by mass of 2-ethylhexyl acrylate, 2 parts by mass of 2-hydroxyethyl acrylate, and 2 parts by mass of acrylic acid were added. Thereafter, a reducing agent-based aqueous solution (aqueous solution in which 0.5 parts by mass of sodium hydrogensulfite and 0.0005 parts by mass of ferric nitrate were dissolved in 10 parts by mass of ion-exchanged water) was added at one time. Since the temperature in the polymerization system increased as soon as the reducing agent-based aqueous solution was added, the temperature was controlled to 90° C. After the temperature was held at 90° C. for 2 hours, the temperature in the polymerization system was decreased, to obtain a seed dispersion liquid for emulsion polymerization. The solid matter concentration of the obtained seed dispersion liquid for emulsion polymerization was 40%.

The contents of a reactor equipped with a stirrer and a jacket for adjusting a temperature were purged with nitrogen. 72 parts by mass of ion-exchanged water, 0.3 parts by mass (solid matter) of a water dispersion (styrene-ethylhexyl acrylate-acrylic acid copolymer; Tg=11° C.) of seed particles having an average particle diameter of about 40 nm, and 0.1 parts by mass (solid matter) of sodium lauryl sulfate were put into the reactor. While these were stirred at a rotation speed of 280 rpm, the inner temperature was increased to 80° C. Thereto, a mixture containing 69 parts by mass of styrene (styrene deoxidized by vacuum deairing), 30 parts by mass of butadiene, 1 part by mass of acrylic acid, 0.4 parts by mass of tert-dodecyl mercaptan, and 0.05 parts by mass of α-methylstyrene dimer was added over 4 hours. The addition of the mixture was started, and almost at the same time, a mixture containing 21 parts by mass of water, 0.1 parts by mass (solid matter) of sodium lauryl sulfate, 0.1 parts by mass (solid matter) of sodium hydroxide, and 0.7 parts by mass (solid matter) of potassium peroxodisulfate was continuously added over 14 hours.

After the completion of the polymerization, the temperature of the reactant was maintained at 80° C. for about 1 hour. Thereafter, sodium hydroxide was added, to adjust the pH of the reactant to about 8.0. Then, the residual monomer was removed by steam stripping, and the reactant was then cooled. The reactant was filtered through a filter fabric of 80 meshes, to obtain a latex. An organic emulsion was obtained by adjusting the solid matter (130° C., drying method) of the obtained latex to 50% by weight. The volume average particle diameter of the obtained organic emulsion was 0.3 µm.

A carbon nanofiber aggregate was obtained in the same manner as in Example 1 except that "VGCF-X" was used as carbon nanofibers in place of "VGCF", and an organic emulsion was added so that a rate of a solid matter in the organic emulsion based on 100 parts by mass of the carbon nanofibers was 5 parts by mass.

A resin composition was produced in the following manner using the obtained carbon nanofiber aggregate, and physical properties thereof were evaluated. First, a polyamide resin composition containing 95% by mass of polyamide and 5% by mass of the carbon nanofiber aggregate was produced in accordance with the above method, and used to evaluate dispersibility. Next, a polyamide resin composition containing 97.5% by mass of polyamide and 2.5% by mass of the carbon nanofiber aggregate was produced in accordance with the above method, and used to evaluate electrical conductivity.

Example 16

Into a reactor equipped with a stirrer, a reflux condenser, a dropping tank, and a thermometer, 8 parts by mass of methacrylic acid, 52 parts by mass of methyl methacrylate, 40 parts by mass of butyl acrylate, 300 parts by mass of water, and 20 parts by mass of a 20% aqueous solution of a diester ammonium sulfosuccinate salt ("Latemul S-180A" (trade name), manufactured by Kao Corporation) were charged. The temperature in the reactor was increased to 78° C. Thereto, 0.5 parts by mass of ammonium persulfate was added, and the temperature was maintained for 1 hour. Thereby, a first step seed latex was prepared. The measured hydrogen ion concentration of the seed latex was pH 1.8.

Next, a mixed liquid containing 3 parts by mass of methacrylic acid, 207 parts by mass of methyl methacrylate, 190 parts by mass of butyl acrylate, and 1.0 part by mass of γ-methacryloxypropyltrimethoxysilane, and a mixed liquid containing 300 parts by mass of water, 20 parts by mass of a 20% aqueous solution of a diester ammonium sulfosuccinate salt ("Latemul S-180A", manufactured by Kao Corporation), and 1.0 part by mass of ammonium persulfate were added dropwise over 3 hours from separate dropping tanks into the reactor. The temperature in the reactor was maintained at 80° C. during dropwise addition. After the completion of dropwise addition, the temperature in the reactor was maintained at 85° C. for 6 hours, and then cooled to room temperature. The measured hydrogen ion concentration of the reactant was pH 2.8. A 25% aqueous ammonia solution was added into the reactant, to adjust the concentration to pH 8. Thereafter, the reactant was filtered through a wire fabric of 100 meshes, to obtain an emulsion.

The rate of the solid matter of the obtained emulsion was 44% by mass, and the volume average particle diameter was 0.095 µm.

A carbon nanofiber aggregate was obtained in the same manner as in Example 1 except that "VGCF-X" was used as carbon nanofibers in place of "VGCF", and an organic emulsion was added so that a rate of a solid matter in the organic emulsion based on 100 parts by mass of the carbon nanofibers was 5 parts by mass.

A resin composition was produced in the following manner using the obtained carbon nanofiber aggregate, and physical properties thereof were evaluated. First, a polyamide resin composition containing 95% by mass of polyamide and 5% by mass of the carbon nanofiber aggregate was produced in accordance with the above method, and used to evaluate dispersibility. Next, a polyamide resin composition containing 97.5% by mass of polyamide and 2.5% by mass of the carbon nanofiber aggregate was produced in accordance with the above method, and used to evaluate electrical conductivity.

Example 17

A polyamide resin composition containing 95% by mass of polyamide and 5% by mass of the carbon nanofiber aggregate obtained in Example 1 was produced in accor-

Example 18

A polyethylene resin composition containing 95% by mass of polyethylene and 5% by mass of the carbon nanofiber aggregate obtained in Example 1 was produced in accordance with the above method. A tensile strength at break at 23° C. and a tensile elongation at break at 23° C. were measured.

Example 19

A polyamide resin composition containing 95% by mass of polyamide and 5% by mass of the carbon nanofiber aggregate obtained in Example 2 was produced in accordance with the above method. A tensile strength at break at 23° C. and a tensile elongation at break at 23° C. were measured.

Example 20

A polyethylene resin composition containing 95% by mass of polyethylene and 5% by mass of the carbon nanofiber aggregate obtained in Example 2 was produced in accordance with the above method. A tensile strength at break at 23° C. and a tensile elongation at break at 23° C. were measured.

Example 21

A polyamide resin composition containing 95% by mass of polyamide and 5% by mass of the carbon nanofiber aggregate obtained in Example 3 was produced with reference to the above method. A tensile strength at break at 23° C. and a tensile elongation at break at 23° C. were measured.

Example 22

A polyethylene resin composition containing 95% by mass of polyethylene and 5% by mass of the carbon nanofiber aggregate obtained in Example 3 was produced in accordance with the above method. A tensile strength at break at 23° C. and a tensile elongation at break at 23° C. were measured.

Example 23

A polyamide resin composition containing 95% by mass of polyamide and 5% by mass of the carbon nanofiber aggregate obtained in Example 4 was produced in accordance with the above method. A tensile strength at break at 23° C. and a tensile elongation at break at 23° C. were measured.

Example 24

A polypropylene resin composition containing 95% by mass of polypropylene and 5% by mass of the carbon nanofiber aggregate obtained in Example 4 was produced in accordance with the above method. A tensile strength at break at 23° C. and a tensile elongation at break at 23° C. were measured.

Example 25

A polyamide resin composition containing 95% by mass of polyamide and 5% by mass of the carbon nanofiber aggregate obtained in Example 5 was produced in accordance with the above method. A tensile strength at break at 23° C. and a tensile elongation at break at 23° C. were measured.

Example 26

A polyethylene resin composition containing 95% by mass of polyethylene and 5% by mass of the carbon nanofiber aggregate obtained in Example 5 was produced in accordance with the above method. A tensile strength at break at 23° C. and a tensile elongation at break at 23° C. were measured.

Example 27

A polyamide resin composition containing 95% by mass of polyamide and 5% by mass of the carbon nanofiber aggregate obtained in Example 6 was produced in accordance with the above method. A tensile strength at break at 23° C. and a tensile elongation at break at 23° C. were measured.

Example 28

A polyethylene resin composition containing 95% by mass of polyethylene and 5% by mass of the carbon nanofiber aggregate obtained in Example 6 was produced in accordance with the above method. A tensile strength at break at 23° C. and a tensile elongation at break at 23° C. were measured.

Example 29

A polyamide resin composition containing 95% by mass of polyamide and 5% by mass of the carbon nanofiber aggregate obtained in Example 7 was produced in accordance with the above method. A tensile strength at break at 23° C. and a tensile elongation at break at 23° C. were measured.

Example 30

A polypropylene resin composition containing 95% by mass of polypropylene and 5% by mass of the carbon nanofiber aggregate obtained in Example 7 was produced in accordance with the above method. A tensile strength at break at 23° C. and a tensile elongation at break at 23° C. were measured.

Example 31

A polyamide resin composition containing 95% by mass of polyamide and 5% by mass of the carbon nanofiber aggregate obtained in Example 8 was produced in accordance with the above method. A tensile strength at break at 23° C. and a tensile elongation at break at 23° C. were measured.

Example 32

A polypropylene resin composition containing 95% by mass of polypropylene and 5% by mass of the carbon nanofiber aggregate obtained in Example 8 was produced in accordance with the above method. A tensile strength at break at 23° C. and a tensile elongation at break at 23° C. were measured.

Example 33

A polyamide resin composition containing 95% by mass of polyamide and 5% by mass of the carbon nanofiber aggregate obtained in Example 9 was produced in accordance with the above method. A tensile strength at break at 23° C. and a tensile elongation at break at 23° C. were measured.

Example 34

A polypropylene resin composition containing 95% by mass of polypropylene and 5% by mass of the carbon nanofiber aggregate obtained in Example 9 was produced in accordance with the above method. A tensile strength at break at 23° C. and a tensile elongation at break at 23° C. were measured.

Example 35

A polyamide resin composition containing 95% by mass of polyamide and 5% by mass of the carbon nanofiber aggregate obtained in Example 10 was produced in accordance with the above method. A tensile strength at break at 23° C. and a tensile elongation at break at 23° C. were measured.

Example 36

A polypropylene resin composition containing 95% by mass of polypropylene and 5% by mass of the carbon nanofiber aggregate obtained in Example 10 was produced in accordance with the above method. A tensile strength at break at 23° C. and a tensile elongation at break at 23° C. were measured.

Example 37

A polyamide resin composition containing 95% by mass of polyamide and 5% by mass of the carbon nanofiber aggregate obtained in Example 11 was produced in accordance with the above method. A tensile strength at break at 23° C. and a tensile elongation at break at 23° C. were measured.

Example 38

A polypropylene resin composition containing 95% by mass of polypropylene and 5% by mass of the carbon nanofiber aggregate obtained in Example 11 was produced in accordance with the above method. A tensile strength at break at 23° C. and a tensile elongation at break at 23° C. were measured.

Example 39

A polyamide resin composition containing 95% by mass of polyamide and 5% by mass of the carbon nanofiber aggregate obtained in Example 12 was produced in accordance with the above method. A tensile strength at break at 23° C. and a tensile elongation at break at 23° C. were measured.

Example 40

A polyethylene resin composition containing 95% by mass of polyethylene and 5% by mass of the carbon nanofiber aggregate obtained in Example 12 was produced in accordance with the above method. A tensile strength at break at 23° C. and a tensile elongation at break at 23° C. were measured.

Example 41

A polyamide resin composition containing 95% by mass of polyamide and 5% by mass of the carbon nanofiber aggregate obtained in Example 13 was produced in accordance with the above method. A tensile strength at break at 23° C. and a tensile elongation at break at 23° C. were measured.

Example 42

A polyethylene resin composition containing 95% by mass of polyethylene and 5% by mass of the carbon nanofiber aggregate obtained in Example 13 was produced in accordance with the above method. A tensile strength at break at 23° C. and a tensile elongation at break at 23° C. were measured.

Example 43

A polyamide resin composition containing 95% by mass of polyamide and 5% by mass of the carbon nanofiber aggregate obtained in Example 14 was produced in accordance with the above method. A tensile strength at break at 23° C. and a tensile elongation at break at 23° C. were measured.

Example 44

A polyamide resin composition containing 95% by mass of polyamide and 5% by mass of the carbon nanofiber aggregate obtained in Example 15 was produced in accordance with the above method. A tensile strength at break at 23° C. and a tensile elongation at break at 23° C. were measured.

Example 45

A polyamide resin composition containing 95% by mass of polyamide and 5% by mass of the carbon nanofiber aggregate obtained in Example 16 was produced in accordance with the above method. A tensile strength at break at 23° C. and a tensile elongation at break at 23° C. were measured.

Example 46

A master batch of a polyamide resin composition containing 20% by mass of the carbon nanofiber aggregate obtained in Example 7 was produced. A pellet of the polyamide resin composition containing 5% by mass of the carbon nanofiber aggregate was produced from the master batch. The carbon nanofiber aggregate produced in Example 7 and polyamide were kneaded in "KZW15" (screw diameter: 15 mm, L/D ratio: 45) manufactured by Technovel Corporation at a temperature of 300° C. and a rotation speed of 200 rpm, to obtain a strand. This was water-cooled and cut, to obtain a polyamide master batch containing 20% by mass of the carbon nanofiber aggregate. The obtained master batch and polyamide pellet (PA: "Reona 1300S" (trade name) manufactured by Asahi Kasei Chemicals Corporation) were formulated so that the rate of the carbon nanofiber aggregate was 5% by mass. These were sufficiently mixed in a polyethylene bag. This was kneaded in "KZW15" manufactured by Technovel Corporation at a temperature of 280° C. and a rotation speed of 500 rpm, to obtain a strand. This strand was water-cooled and cut, to obtain a polyamide resin composition pellet containing 5% by mass of the carbon nanofiber aggregate. Dispersibility was evaluated, and the L/D ratio of the carbon nanofiber in the polyamide resin composition was measured.

Example 47

A master batch of a polyamide resin composition containing 20% by mass of the carbon nanofiber aggregate obtained in Example 8 was produced in accordance with the same method as that of Example 46. A pellet of the polyamide resin composition containing 5% by mass of the carbon nanofiber aggregate was produced from the master batch. Dispersibility was evaluated, and an L/D ratio of carbon nanofiber in the polyamide resin composition was measured.

Example 48

A master batch of a polyamide resin composition containing 20% by mass of the carbon nanofiber aggregate obtained in Example 11 was produced in accordance with the same method as that of Example 46. A pellet of the polyamide resin composition containing 5% by mass of the carbon nanofiber aggregate was produced from the master batch. Dispersibility was evaluated, and an L/D ratio of carbon nanofiber in the polyamide resin composition was measured.

Comparative Example 1

Into a 1 L eggplant-shape flask, 10 g of carbon nanofibers ("VGCF-X" (trade name)) were charged. Into the carbon nanofibers, 40% by mass of water was added to obtain a mixture. The obtained mixture was vacuum-deaired at a temperature of about 80° C. for 10 minutes by an evaporator. Thereafter, the mixture was pulverized in a mortar, to obtain a carbon nanofiber aggregate.

A resin composition was produced according to the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Comparative Example 2

Into a 1 L eggplant-shape flask, 10 g of carbon nanofibers ("VGCF-X" (trade name)) were charged. An ethanol solution containing 10% by mass of polyethylene glycol 6000 (PEG, reagent) was added in an amount of 50% by mass based on the carbon nanofibers into the flask, to obtain a mixture. The obtained mixture was vacuum-deaired at a temperature of about 80° C. for 10 minutes with an evaporator. Thereafter, the mixture was pulverized in a mortar, to obtain a carbon nanofiber aggregate.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polyethylene resin composition containing 95% by mass of polyethylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Comparative Example 3

Into a 2 L eggplant-shape flask, 10 g of a carbon nanofiber aggregate ("VGCF-X" (trade name)), 1 g of acid-modified SEBS ("Tuftec M1913" (trade name) manufactured by Asahi Kasei Chemicals Corporation; maleic anhydride modified SEBS), and 300 mL of toluene were charged to obtain a mixture. The obtained mixture was vacuum-deaired at a temperature of 80° C. using an evaporator. Thereafter, the mixture was pulverized in a mortar, to obtain a carbon nanofiber aggregate.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. The resin composition was used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Comparative Example 4

Into a 2 L eggplant-shape flask, 10 g of a carbon nanofiber aggregate and 300 mL of ethanol were charged. The mixture was vacuum-deaired at a temperature of about 60° C. by an evaporator, to distill a solvent. A circular mold (diameter: 100 mm, thickness: 1 mm) was filled with the mixture. The mixture was press-molded, to obtain a molded product. The obtained molded product was pulverized in a mortar, to obtain a carbon nanofiber aggregate.

A resin composition was produced in the following manner using the obtained carbon nanofiber aggregate, and physical properties thereof were evaluated.

First, a polyamide resin composition containing 95% by mass of polyamide and 5% by mass of the carbon nanofiber aggregate was produced in accordance with the above method. Similarly, a polypropylene resin composition containing 95% by mass of polypropylene and 5% by mass of the carbon nanofiber aggregate was produced. These resin compositions were used to evaluate dispersibility.

Next, a polyamide resin composition containing 97.5% by mass of polyamide and 2.5% by mass of the carbon nanofiber aggregate was produced in accordance with the above method. The resin composition was used to evaluate electrical conductivity.

Comparative Example 5

A polyamide resin composition containing 95% by mass of polyamide and 5% by mass of the carbon nanofiber aggregate obtained in Comparative Example 1 was produced in accordance with the above method. A tensile strength at break at 23° C. and a tensile elongation at break at 23° C. were measured.

Comparative Example 6

A polyethylene resin composition containing 95% by mass of polyethylene and 5% by mass of the carbon nanofiber aggregate obtained in Comparative Example 1 was produced in accordance with the above method. A tensile strength at break at 23° C. and a tensile elongation at break at 23° C. were measured.

Comparative Example 7

A polyamide resin composition containing 95% by mass of polyamide and 5% by mass of the carbon nanofiber aggregate obtained in Comparative Example 2 was produced in accordance with the above method. A tensile strength at break at 23° C. and a tensile elongation at break at 23° C. were measured.

Comparative Example 8

A polyethylene resin composition containing 95% by mass of polyethylene and 5% by mass of the carbon nanofiber aggregate obtained in Comparative Example 2 was produced in accordance with the above method. A tensile strength at break at 23° C. and a tensile elongation at break at 23° C. were measured.

Comparative Example 9

A polyamide resin composition containing 95% by mass of polyamide and 5% by mass of the carbon nanofiber aggregate obtained in Comparative Example 3 was produced in accordance with the above method. A tensile strength at break at 23° C. and a tensile elongation at break at 23° C. were measured.

Comparative Example 10

A polyamide resin composition containing 95% by mass of polyamide and 5% by mass of the carbon nanofiber aggregate obtained in Comparative Example 4 was produced in accordance with the above method. A tensile strength at break at 23° C. and a tensile elongation at break at 23° C. were measured.

Comparative Example 11

A polypropylene resin composition containing 95% by mass of polypropylene and 5% by mass of the carbon nanofiber aggregate obtained in Comparative Example 4 was produced in accordance with the above method. A tensile strength at break at 23° C. and a tensile elongation at break at 23° C. were measured.

The physical properties and evaluation results of Examples and Comparative Examples are shown in Tables 1 to 6 below.

TABLE 1

| No. | Details of samples | P1 cm$^3$/g | P1/P2 | Q2/(Q1 + Q2) | Scatter | Dispersibility (in filling of 5% by mass) | Maximum filling rate to polyamide (% by mass) | Surface resistance of polyamide composition (in filling of 2.5% by mass) (Ω/□) |
|---|---|---|---|---|---|---|---|---|
| Example 1 | VGCF/modified rosin (10% by mass) | 0.64 | 1.4 | 0.45 | G | A (PA, PE) | 40 | $2 \times 10^{12}$ |
| Example 2 | VGCF-S/modified rosin (10% by mass) | 0.60 | 3.0 | 0.43 | G | A (PA, PE) | 35 | $6 \times 10^{8}$ |
| Example 3 | VGCF-S/SEBS (10% by mass) | 0.62 | 3.0 | 0.43 | G | A (PA, PE) | 35 | $3 \times 10^{8}$ |
| Example 4 | VGCF-X/modified rosin (10% by mass) | 0.20 | 1.7 | 0.79 | G | A (PA, PP) | 30 | $6 \times 10^{5}$ |
| Example 5 | VGCF-X/modified SEBS (10% by mass) | 0.18 | 1.1 | 0.81 | G | A (PA, PE) | 30 | $4 \times 10^{5}$ |
| Example 6 | VGCF-X/PS (10% by mass) | 0.21 | 1.6 | 0.80 | G | A (PA, PE) | 30 | $6 \times 10^{5}$ |
| Example 7 | VGCF-X/modified rosin (5% by mass) | 0.25 | 2.0 | 0.80 | G | A (PA, PP) | 30 | $8 \times 10^{4}$ |
| Example 8 | VGCF-X/modified SEBS (5% by mass) | 0.21 | 1.8 | 0.82 | G | A (PA, PP) | 30 | $2 \times 10^{5}$ |
| Example 9 | VGCF-X/SEBS (5% by mass) | 0.24 | 1.4 | 0.78 | G | A (PA, PP) | 30 | $3 \times 10^{5}$ |
| Example 10 | VGCF-X/PS (5% by mass) | 0.22 | 1.7 | 0.81 | G | A (PA, PP) | 30 | $4 \times 10^{5}$ |

TABLE 2

| No. | Details of samples | P1 cm³/g | P1/P2 | Q2/(Q1 + Q2) | Scatter | Dispersibility (in filling of 5% by mass) | Maximum filling rate to polyamide (% by mass) | Surface resistance of polyamide composition (in filling of 2.5% by mass) ($\Omega/\square$) |
|---|---|---|---|---|---|---|---|---|
| Example 11 | VGCF-X/styrene-maleic anhydride copolymer (5% by mass) | 0.19 | 1.8 | 0.82 | G | A (PA, PP) | 30 | $9 \times 10^4$ |
| Example 12 | VGCF-X/ethylene-vinylacetate copolymer (5% by mass) | 0.22 | 1.6 | 0.82 | G | A (PA, PE) | 30 | $6 \times 10^5$ |
| Example 13 | VGCF-X/esterified styrene-maleic anhydride copolymer (5% by mass) | 0.20 | 1.3 | 0.77 | G | A (PA, PE) | 30 | $5 \times 10^5$ |
| Example 14 | VGCF-X/polyacrylic polymer (5% by mass) | 0.19 | 1.5 | 0.80 | G | A (PA) | 30 | $9 \times 10^4$ |
| Example 15 | VGCF-X/synthetic SBR emulsion (5% by mass) | 0.18 | 1.9 | 0.85 | G | A (PA) | 30 | $7 \times 10^5$ |
| Example 16 | VGCF-X/synthetic polyacrylic emulsion (5% by mass) | 0.15 | 2.3 | 0.86 | G | A (PA) | 30 | $6 \times 10^5$ |
| Comparative Example 1 | VGCF-X/water granulation | 0.81 | 3.5 | 0.73 | G | D (PA, PE) | 10 | $8 \times 10^{13}$ |
| Comparative Example 2 | VGCF-X/PEG granulation | 0.16 | 4.0 | 0.70 | G | D (PA, PE) | 20 | $3 \times 10^{13}$ |
| Comparative Example 3 | VGCF-X/modified SEBS (10% by mass) toluene modified SEBS solution coating | 0.14 | 4.2 | 0.72 | G | D (PA) | 25 | $5 \times 10^{13}$ |
| Comparative Example 4 | VGCF-X/ethanol drying press granulation | 0.65 | 3.5 | 0.71 | G | D (PA, PP) | 15 | $7 \times 10^{13}$ |

TABLE 3

| No. | Carbon nanofiber aggregate | Thermoplastic resin | Break strength in filling of 5% by mass of carbon nanofibers (MPa; 23° C.) | Break elongation in filling of 5% by mass of carbon nanofibers (%; 23° C.) |
|---|---|---|---|---|
| Example 17 | VGCF/modified rosin (10% by mass) Example 1 | PA | 82 | 35 |
| Example 18 | VGCF/modified rosin (10% by mass) Example 1 | PE | 15 | 85 |
| Example 19 | VGCF-S/modified rosin (10% by mass) Example 2 | PA | 86 | 25 |
| Example 20 | VGCF-S/modified rosin (10% by mass) Example 2 | PE | 16 | 80 |
| Example 21 | VGCF-S/SEBS (10% by mass) Example 3 | PA | 80 | 32 |
| Example 22 | VGCF-S/SEBS (10% by mass) Example 3 | PE | 14 | 100 |
| Example 23 | VGCF-X/modified rosin (10% by mass) Example 4 | PA | 105 | 20 |
| Example 24 | VGCF-X/modified rosin (10% by mass) Example 4 | PP | 30 | 30 |
| Example 25 | VGCF-X/modified SEBS (10% by mass) Example 5 | PA | 100 | 30 |
| Example 26 | VGCF-X/modified SEBS (10% by mass) Example 5 | PE | 17 | 90 |
| Example 27 | VGCF-X/PS (10% by mass) Example 6 | PA | 107 | 16 |
| Example 28 | VGCF-X/PS (10% by mass) Example 6 | PE | 18 | 75 |
| Example 29 | VGCF-X/modified rosin (5% by mass) Example 7 | PA | 106 | 23 |
| Example 30 | VGCF-X/modified rosin (5% by mass) Example 7 | PP | 31 | 35 |
| Example 31 | VGCF-X/modified SEBS (5% by mass) Example 8 | PA | 103 | 27 |
| Example 32 | VGCF-X/modified SEBS (5% by mass) Example 8 | PP | 28 | 39 |
| Example 33 | VGCF-X/SEBS (5% by mass) Example 9 | PA | 102 | 26 |
| Example 34 | VGCF-X/SEBS (5% by mass) Example 9 | PP | 28 | 40 |
| Example 35 | VGCF-X/PS (5% by mass) Example 10 | PA | 106 | 18 |

TABLE 4

| No. | Carbon nanofiber aggregate | Thermoplastic resin | Break strength in filling of 5% by mass of carbon nanofibers (MPa; 23° C.) | Break elongation in filling of 5% by mass of carbon nanofibers (%; 23° C.) |
|---|---|---|---|---|
| Example 36 | VGCF-X/PS (5% by mass) Example 10 | PP | 32 | 30 |
| Example 37 | VGCF-X/styrene-maleic anhydride copolymer (5% by mass) Example 11 | PA | 104 | 12 |
| Example 38 | VGCF-X/styrene-maleic anhydride copolymer (5% by mass) Example 11 | PP | 28 | 17 |
| Example 39 | VGCF-X/ethylene-vinylacetate copolymer (5% by mass) Example 12 | PA | 100 | 35 |
| Example 40 | VGCF-X/ethylene-vinylacetate copolymer (5% by mass) Example 12 | PE | 18 | 75 |
| Example 41 | VGCF-X/esterified styrene-maleic anhydride copolymer (5% by mass) Example 13 | PA | 105 | 19 |
| Example 42 | VGCF-X/esterified styrene-maleic anhydride copolymer (5% by mass) Example 13 | PE | 19 | 70 |
| Example 43 | VGCF-X/polyacrylic polymer (5% by mass) Example 14 | PA | 102 | 38 |
| Example 44 | VGCF-X/synthetic SBR emulsion (5% by mass) Example 15 | PA | 100 | 40 |
| Example 45 | VGCF-X/synthetic polyacrylic emulsion (5% by mass) Example 16 | PA | 101 | 40 |

TABLE 5

| No. | Carbon nanofiber aggregate | Thermoplastic resin | Break strength in filling of 5% by mass of carbon nanofibers (MPa; 23° C.) | Break elongation in filling of 5% by mass of carbon nanofibers (%; 23° C.) |
|---|---|---|---|---|
| Comparative Example 5 | VGCF-X water granulation | PA | 72 | 6 |
| Comparative Example 6 | VGCF-X water granulation | PE | 11 | 30 |
| Comparative Example 7 | VGCF-X/PEG granulation | PA | 70 | 4 |
| Comparative Example 8 | VGCF-X/PEG granulation | PE | 10 | 15 |
| Comparative Example 9 | VGCF-X/modified SEBS (10% by mass) toluene modified SEBS solution coating | PA | 78 | 9 |
| Comparative Example 10 | VGCF-X/ethanol drying press granulation | PA | 69 | 4 |
| Comparative Example 11 | VGCF-X/ethanol drying press granulation | PP | 20 | 6 |

TABLE 6

| No. | Carbon nanofiber aggregate | Thermoplastic resin | Dispersibility in filling of 5% by mass of carbon nanofiber aggregate | L/D ratio in filling of 5% by mass of carbon nanofiber aggregate |
|---|---|---|---|---|
| Example 46 | VGCF-X/modified rosin (5% by mass) Example 7 | PA | A | 58 |
| Example 47 | VGCF-X/modified SEBS (5% by mass) Example 8 | PA | A | 55 |
| Example 48 | VGCF-X/styrene-maleic anhydride copolymer (5% by mass) Example 11 | PA | A | 56 |

As described above, it was confirmed that the carbon nanofiber aggregates of Examples can suppress scatter and have excellent dispersibility and excellent filling property in the thermoplastic resin. Furthermore, it was also confirmed that the carbon nanofiber aggregates can provide the resin composition having an excellent electrical property or the like.

The present application is based on a Japanese patent application filed on Oct. 12, 2011 with Japan Patent Office (Japanese Patent Application No. 2011-225379), which is hereby incorporated by reference herein.

INDUSTRIAL APPLICABILITY

The carbon nanofiber aggregate of the present invention facilitates mixing and dispersing thereof in the thermoplastic resin as compared with the conventional one, which enables an improvement of physical properties of various thermoplastic resins or the like, and has industrial applicability in wide applications.

What is claimed is:

1. A carbon nanofiber aggregate having
a maximum void volume P1 ($cm^3/g$) at a pore diameter of 2,500 nm or more and 100,000 nm or less and
a maximum void volume P2 ($cm^3/g$) at a pore diameter of 6 nm or more and less than 2,500 nm in pore distribution data measured by mercury porosimetry,
wherein the maximum void volume P1 and the maximum void volume P2 satisfy relationships of the following formulae (1) and (2):

$$0.01 \leq P1 \leq 1 \quad (1)$$

$$0 < P1/P2 \leq 3.3 \quad (2)$$

and wherein the carbon nanofiber aggregate comprises
(A) carbon nanofibers and
(B) a modified rosin;
wherein the carbon nanofiber aggregate comprises 100 parts by mass of component (A), 0.1 to 50 parts by mass of component (B), and 0.01 to 30 parts by mass of (C) a surfactant.

2. The carbon nanofiber aggregate according to claim 1, wherein the carbon nanofiber aggregate has a three-dimensionally assembled structure as a structure where carbon nanofibers contained in the carbon nanofiber aggregate are entangled with each other.

3. The carbon nanofiber aggregate according to claim 1 or 2, wherein the carbon nanofiber aggregate has
an integrating void volume Q1 ($cm^3/g$) at a pore diameter of 2,500 nm or more and 100,000 nm or less and
an integrating void volume Q2 ($cm^3/g$) at a pore diameter of 6 nm or more and less than 2,500 nm in the pore distribution data measured by the mercury porosimetry; and
wherein the integrating void volume Q1 and the integrating void volume Q2 satisfy a relationship of the following formula (3):

$$0.75 \leq Q2/(Q1+Q2) < 1 \quad (3).$$

4. The carbon nanofiber aggregate according to claim 1 or 2,
wherein a content of the carbon nanofiber aggregate having a particle size passing through a sieve having a nominal opening of more than 0.3 mm and 4.75 mm or less specified according to JIS Z8801-1 is 90% by mass or more.

5. The carbon nanofiber aggregate according to claim 4, wherein a content of the component (B) based on 100 parts by mass of the component (A) is from 0.1 to 40 parts by mass.

6. A thermoplastic resin composition comprising
a thermoplastic resin and
the carbon nanofiber aggregate according to claim 1 or 2.

7. The thermoplastic resin composition according to claim 6, wherein an L/D ratio of the carbon nanofiber in the thermoplastic resin composition is 50 or more.

8. The thermoplastic resin composition according to claim 7, wherein when a slice is cut out from each ten pellets formed from the thermoplastic resin composition by a microtome and slices are observed in a viewing angle of 200 μm×200 μm with an optical microscope (400 times), all long axes of the carbon nanofiber aggregates observed in an observed area of the optical microscope are less than 10 μm.

9. A method for producing a thermoplastic resin composition,
the method comprising the step of melting and kneading a thermoplastic resin and the carbon nanofiber aggregate according to claim 1 or 2 to provide the thermoplastic resin composition.

* * * * *